Aug. 23, 1966  F. S. AJERO ET AL  3,268,099
UNIVERSAL POWER CONVEYOR
Filed Nov. 4, 1964  5 Sheets-Sheet 1
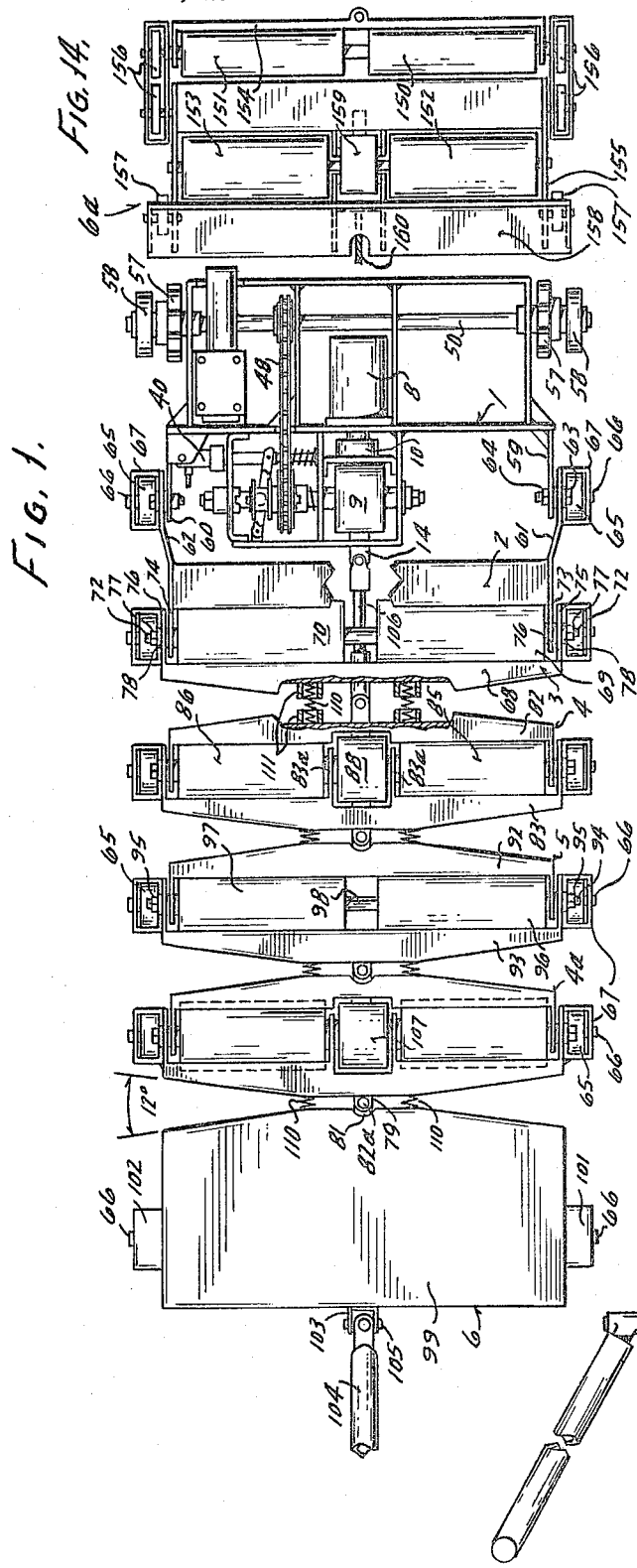
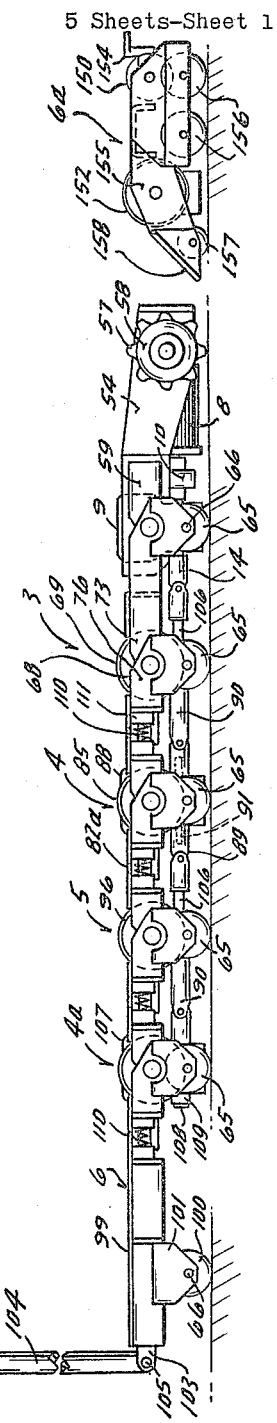
INVENTORS.
FORTUNATO S. AJERO
WILLIAM C. BENSON
BY
John F. Friedl
ATTORNEY.

Aug. 23, 1966    F. S. AJERO ET AL    3,268,099
UNIVERSAL POWER CONVEYOR
Filed Nov. 4, 1964    5 Sheets-Sheet 3
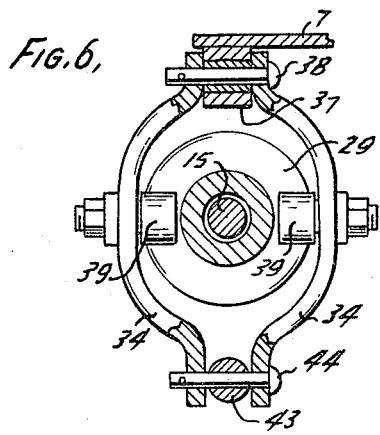
FIG. 6.
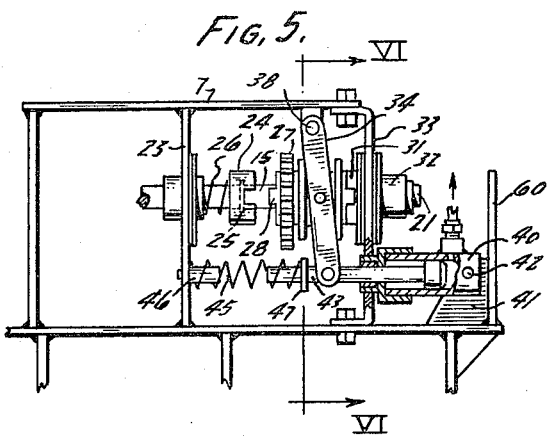
FIG. 5.
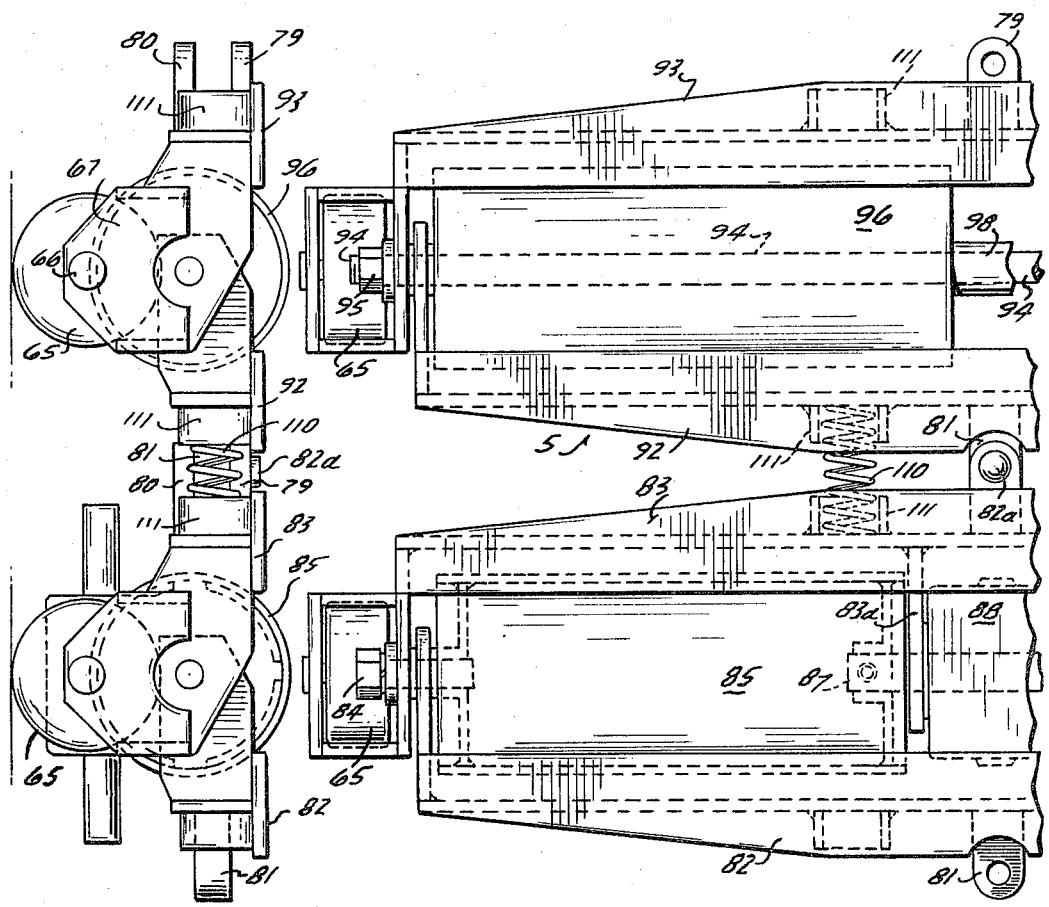
FIG. 8.    FIG. 7.
INVENTORS.
FORTUNATO S. AJERO
WILLIAM C. BENSON
BY 
ATTORNEY.

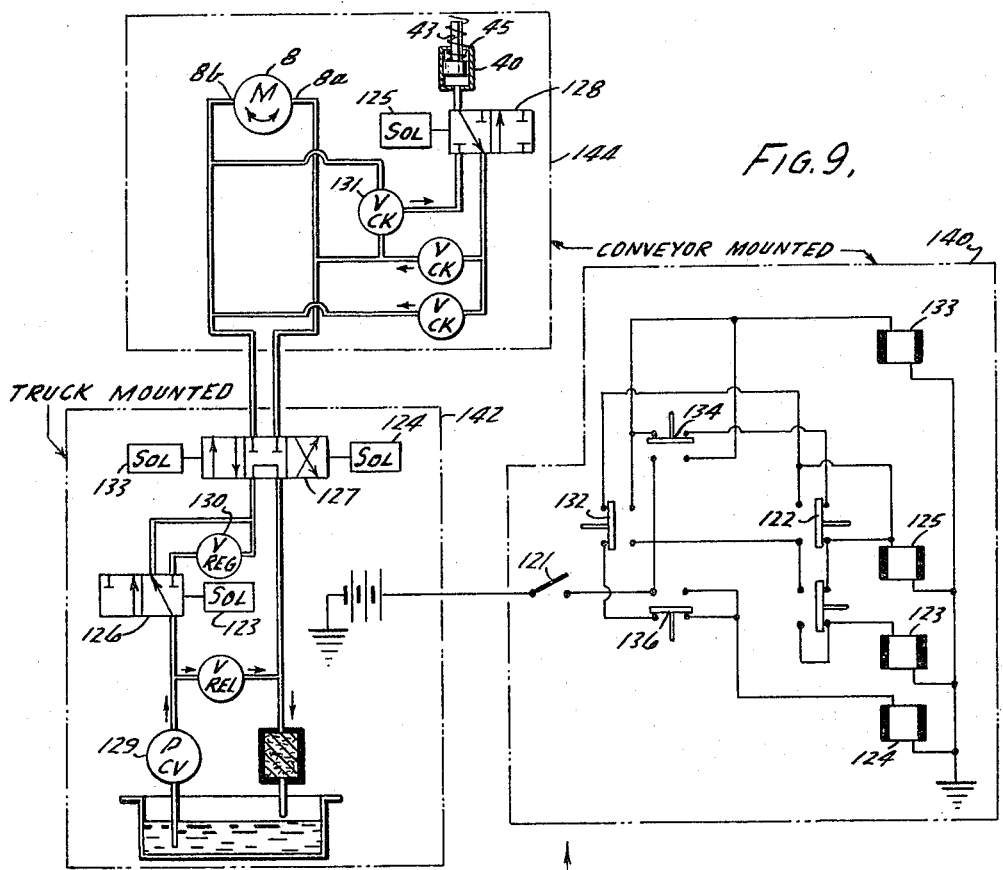
FIG. 9.
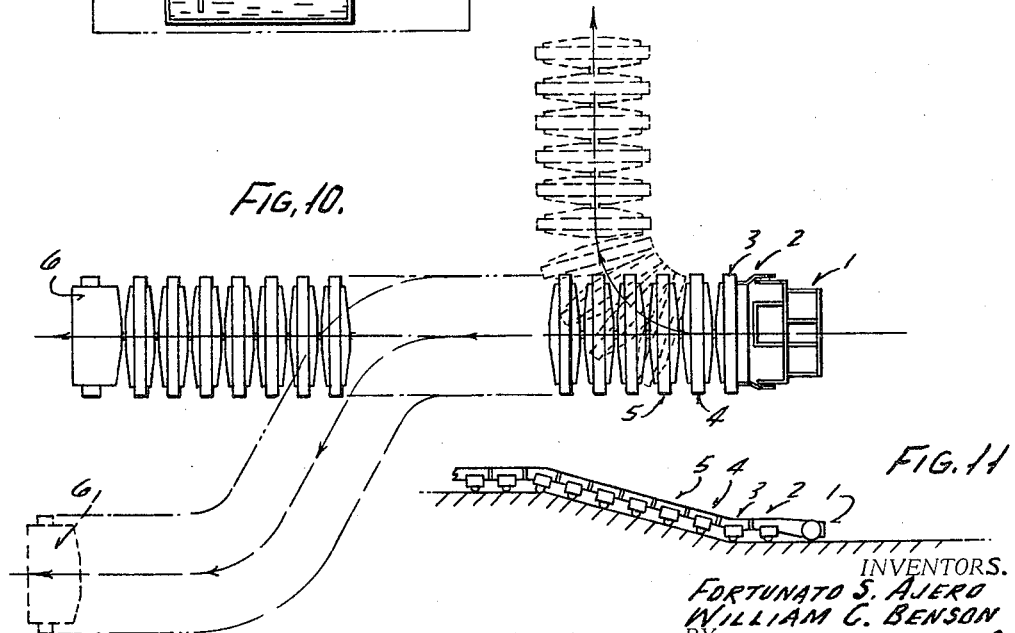
FIG. 10.
FIG. 11.
INVENTORS.
FORTUNATO S. AJERO
WILLIAM C. BENSON
BY
John F. Friedl
ATTORNEY.

Aug. 23, 1966    F. S. AJERO ET AL    3,268,099
UNIVERSAL POWER CONVEYOR

Filed Nov. 4, 1964    5 Sheets-Sheet 5

INVENTORS.
FORTUNATO S. AJERO
WILLIAM C. BENSON
BY
John F. Friedl
ATTORNEY.

United States Patent Office 3,268,099
Patented August 23, 1966

3,268,099
UNIVERSAL POWER CONVEYOR
Fortunato S. Ajero and William C. Benson, Springfield, Ohio, assignors to Koehring Company, Milwaukee, Wis., a corporation of Wisconsin
Filed Nov. 4, 1964, Ser. No. 408,872
14 Claims. (Cl. 214—84)

The present invention relates to powered roller conveyors and more particularly to a device for transferring boxed or packaged cargo, luggage, etc., between aircraft and ground support vehicles.

Conventional power conveyors using rollers or belts are limited in their function only to cargo transfer operations between ground vehicles and the aircraft cargo door. Extension of transfer operations into the aircraft cargo hold can only be accomplished manually using floor rollers or mechanically with winching means.

Unlike conventional power conveyors, the conveyor of this invention is primarily designed to convey air cargo between ground vehicles and the aircraft cargo hold. Its size and weight readily adapt it for mounting on ground vehicles and in use it can be powered to extend from its support vehicle to a cargo door and guided therefrom forward or aft into the aircraft cargo hold describing a full ninety degree turn in the horizontal plane.

It will be appreciated that the ability of the present device to extend and operate inside a cargo hold not only speeds up the loading and unloading operations but accomplishes this objective with less manpower than required with conventional conveyors. As will be explained in detail hereinafter, the present conveyor is specially designed to transfer cargo around corners so that the danger of the cargo sliding off the conveyor at such corners is reduced to a minimum.

The device is also designed to keep floor height (height of conveying surface from floor) to the minimum making it possible to convey large objects, boxes, etc. through low clearance doors of aircraft cargo holds as found on so-called "belly" compartments of combination passenger and cargo aircraft.

The device further incorporates articulating means in its structure to provide a limited longitudinal flexibility in the vertical plane to allow said device to bridge two vertically misaligned points during the ejection, retraction and conveying phases of its operation.

Other objects and advantages will be pointed out in, or be apparent from the description and claims, as will obvious modifications of the two embodiments shown in the drawings, in which:

FIG. 1 is a plan view (with parts broken away) of a conveyor device embodying the present invention wherein a multiplicity of like components is held to a minimum to simplify the description;

FIG. 2 is a side elevation view of the device shown in FIG. 1;

FIG. 5 is a fragmentary plan view of the drive control mechanism shown in FIG. 3;

FIG. 6 is a sectional view taken along line 6—6 of FIG. 5;

FIG. 7 is an enlarged fragmentary plan view of a pair of power and idler roller assemblies;

FIG. 8 is a side elevation view of the roller assemblies shown in FIG. 7;

FIG. 9 is a partially schematic electro-hydraulic circuit diagram showing the control system for the device;

FIG. 10 is a partially schematic plan view of a conveyor made in accordance with the present invention shown in a reduced scale to illustrate how the device can be used to carry cargo around corners described in a horizontal plane;

FIG. 11 is a partially schematic side elevation view of the conveyor shown in a reduced scale to illustrate the longitudinal flexibility of the device in a vertical plane;

FIG. 14 is a top plan view of a modified platform end portion of the conveyor device; and FIG. 15 is a side elevation view of the modified conveyor mechanism shown in FIG. 14.

Figure 3:
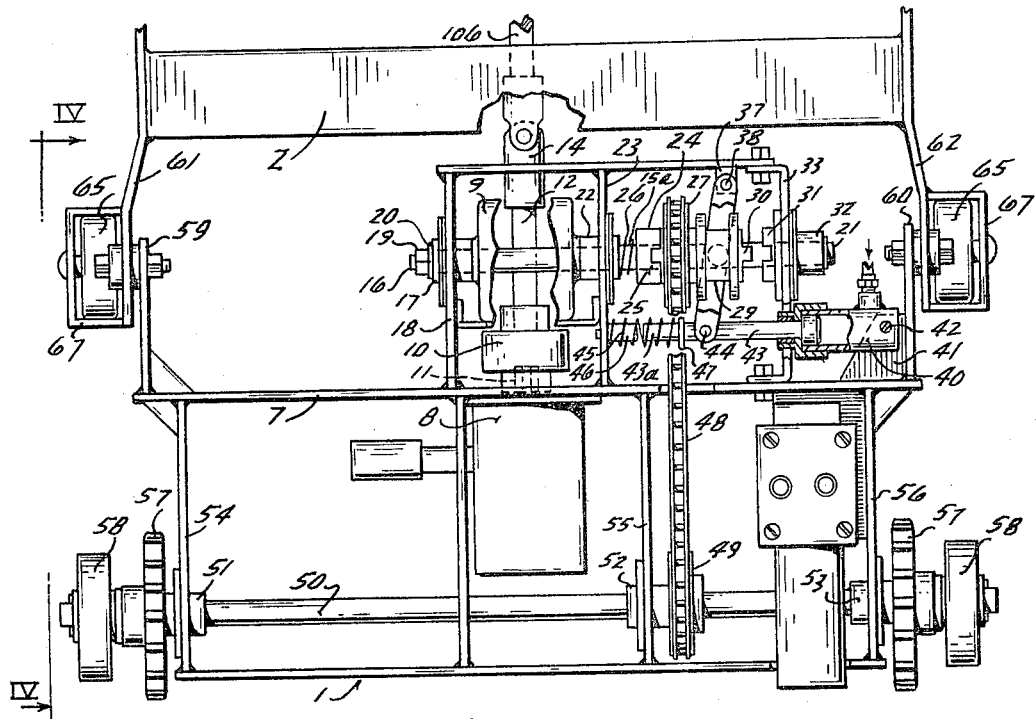
FIG. 3 is an enlarged fragmentary plan view (with parts broken away) of the power and control portion of the device shown in FIG. 1.

Referring to the drawings in detail, FIGS. 1 and 2 show a complete conveyor apparatus comprising a power base assembly 1, a link assembly 2, a link roller assembly 3, a power roller assembly 4, an idler roller assembly 5, and a transfer platform assembly 6.

It should be understood at this point that power and idler roller assemblies 4 and 5, respectively, are used in pairs with the number of such pairs dependent on the desired length of the conveyor. For purposes of clarity and simplicity, only one pair of power and idler roller assemblies is shown in the drawings and described herein.

*Power base assembly*

Figure 4:
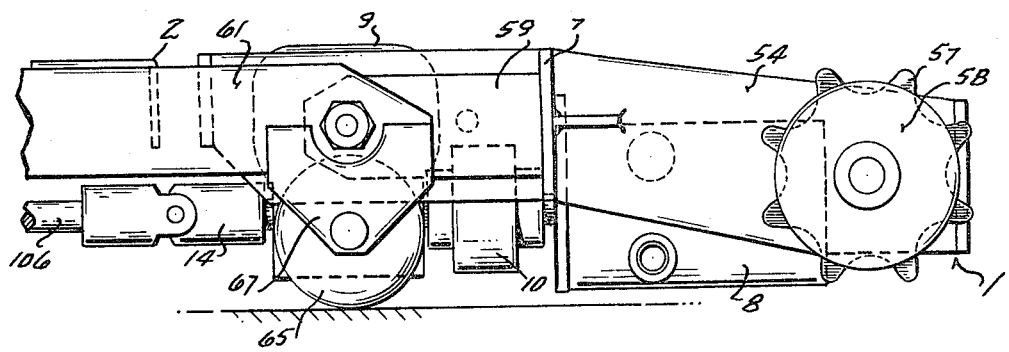
FIG. 4 is a fragmentary side elevation view taken along line 4—4 of FIG. 3.

Referring now to FIGS. 3 and 4, power base assembly 1 is comprised of a base frame 7 provided with a centrally mounted hydraulic motor 8 and a speed reducer or gear box 9 coupled together and forming the primary power and drive means for the conveyor. Power transfer between motor 8 and gear box 9 is accomplished by a semi-flexible coupling 10 connecting the hydraulic motor power shaft 11 with the rearwardly projecting portion of the gear box input shaft 12. Input shaft 12 also projects forwardly of the lower portion of the gear box 9 and is provided with a universal joint 14 adapted for connection to the drive mechanism for power roller assemblies 4 as will be described hereinafter.

The gear box 9 is of the type having an output shaft 15 which is transversely disposed above the input shaft 12. Output shaft 15 projects transversely from the upper portion of gear box 9 with the left-hand end portion 16 thereof journaled in a ball bearing 17 secured to a frame support member 18 by a washer 20 and a lock nut 19 as shown in FIG. 3.

As viewed in FIG. 3, the central portion of output shaft 15 is journaled in a ball bearing 22 mounted on base frame support member 23 and extends through a slidably mounted splined clutch jaw 24 which is held against a stop ring 25 by a conical compression spring 26. Shaft 15 is provided with a central splined portion 15a adapted for engagement with splined clutch jaw 24.

Also slidably disposed on the right-hand end portion of output shaft 15 is a freely rotating drive sprocket 27 having a clutch dog 28, a clutch spool 29, and a brake dog 30 made a part thereof. Brake dog 30 is adapted for engagement with a stationary brake jaw 31 which is secured together with ball bearing 32 to base frame support member 33. Ball bearing 32 forms additional support means for the right-hand end portion 21 of output shaft 15.

Drive sprocket 27 is slidably actuated on shaft 15 by means of a pair of clutch throw-out levers 34, 34 pivotally mounted at one end on a stationary bracket 37 by a pivot pin 38 and pivotally connected at the other end to a piston rod 43 by a pivot pin 44 as clearly shown in FIG. 6. Lever arms 34, 34 (FIG. 6) are curved to partially encircle clutch spool 29 and are operatively connected to such spool by means of a pair of cam rollers 39, 39 mounted on the lever arms.

Piston rod 43 is slidably mounted in a hydraulic cylinder 40 which is pivotally anchored between a pair of gusset plates 41, 41 by a pin 42. Cylinder 40 is of the single acting type with rod 43 normally held in retracted position by a compression spring 45 mounted on a guide pin 46 welded to support member 23 of frame 7. The free end of spring 45 abuts against a spring retainer washer 47 mounted on the shouldered end 43a of piston rod 43. Thus, with cylinder 40 in deenergized condition spring 45 will force the parts to the braking position as shown in FIG. 5 wherein brake dog 30 of drive sprocket 27 is engaged with brake jaw 31. Upon energization of cylinder 40, piston rod 43 will be actuated to the position shown in FIG. 3 wherein clutch jaw 24 will be engaged by clutch dog 28 to thereby place drive sprocket 27 in driven engagement with output shaft 15 of gear box 9.

Drive sprocket 27 is provided with a drive chain 48 designed to drive the axle sprocket 49 which is keyed to axle shaft 50 as shown in FIG. 3. Axle shaft 50 is supported by ball bearings 51, 52 and 53 bolted to respective support members 54, 55 and 56 of base frame 7. A pair of traction wheels 57, 57 are keyed to opposite ends of shaft 50 to impart movement to the entire conveyor apparatus as will be described hereinafter. A pair of press wheels 58, 58 (of smaller diameter than wheels 47) are freely rotatably mounted on the extreme outer ends of shaft 50. The operation and function of wheels 58 will be explained in detail hereinafter.

*Link assembly and link roller assembly*

FIGS. 1 and 2 show the forwardly extending support arms 59 and 60 of frame 7 pivotally secured to rear support arms 61 and 62 of link assembly 2 by hinge bolts 63 and lock nuts 64. Front rolling support for power assembly 1 is provided by two free rolling support wheels 65 each mounted by a pin 66 within the confines of a wheel housing 67 secured to the rear support arms 61 and 62 of link assembly 2.

Also as shown in FIGS. 1 and 2, the link roller assembly 3 is comprised of a link roller carrier 68 having roller support wheels 65 and mounting mechanism like that of the above described link assembly 2. Link roller assembly 3 further includes a pair of axially aligned freely and independently rotating rollers 69 and 70 separated by a spacer 71 all of which are mounted on a support shaft 72. Support shaft 72 also serves as a hinge pivot means between front support arms 73 and 74 of link assembly 2 and rearwardly extending shaft support arms 75 and 76 of link roller assembly 3. Shaft 72 is held in assembled position between arms 75, 76 of carrier 68 by lock nuts 77 and washers 78 as shown.

The above described hinging means allows a limited vertical articulation between the power base 1, link assembly 2 and link roller assembly 3. As will be described further herein a similar vertical hinging means is also included in the structural configuration of the power roller assembly 4 and idler roller assembly 5.

The link roller assembly 3 described above is further provided with a pair of hinge lugs 79 and 80 centrally disposed and secured to link roller carrier 68 as shown in FIGS. 1 and 2. Said hinge lugs are designed to mate with the center hinge lug 81 secured to the rear carrier member 82 of the adjacent power roller assembly 4 with the respective hinge lugs pivotally secured together by a pin 82a.

*Power roller assembly*

Referring to FIGS. 7 and 8, power roller assembly 4 is comprised of the above-mentioned rear carrier member 82 hinged to a front carrier member 83 by a pair of step bolts 84. Step bolts 84 are designed to serve as outboard bearing supports for a pair of power rollers 85 and 86 which are in turn rotatably supported and driven at their inboard ends by a splined output shaft 87 of a gear box 88 centrally mounted on front carrier member 83 by support arms 83a. Roller support means (including wheels 65) for said power roller assembly are mounted on the outboard ends of front carrier member 83 and are identical in construction to that found on link roller assembly 3 previously described. Likewise, the gear box 88 is similar in construction to gear box 9 used on power base assembly 1 except for opposite output shaft rotation as will be explained further herein.

Gear box 88 (FIG. 2) is provided with universal joints 89, 90 respectively mounted on the front and rear ends of gear box input shaft 91. It should be noted that the front carrier member 83 of power roller assembly 4 is provided with integral center hinge lugs similar to those found on link roller carrier 68 of link roller assembly 2 to provide hinged connecting means with the adjacent idler roller assembly 5 as shown in FIGS. 1 and 2.

*Idler roller assembly*

FIGS. 8 and 9 also show the detailed construction of idler roller assembly 5 which is comprised of a rear carrier member 92 hinged to a front carrier member 93 by a single shaft 94 secured in position by lock nuts 95. Shaft 94 further serves to support a pair of freely and independently rotatable idler rollers 96 and 97 and a spacer sleeve 98 therebetween. A pair of roller support wheels 65 for idler roller assembly 5 are mounted on front carrier member 93 in the manner previously described with respect to roller link assembly 3. Similarly, a front and rear center hinge means is provided to pivotally connect the idler roller assembly 5 to the adjacent power roller assemblies 4 and 4a.

*Transfer platform and power transfer means*

As shown in FIGS. 1 and 2, power roller assembly 4a is hingedly connected to a transfer platform assembly 6 which serves as the front section of the conveyor. Transfer platform assembly 6 is comprised of a rectangular base member 99 supported on two free rolling wheels 100 mounted in wheel housings 101 and 102. Pivotally mounted on the front center portion of base member 99 is a clevis 103 to which is secured the lower end portion of control handle 104 by means of a pivot pin 105. In the preferred embodiment of this invention the control switches for operating the conveyor are mounted on handle 104 as will be explained hereinafter.

A modified type of transfer platform 6a is shown in FIGS. 14 and 15. Platform assembly 6a may be used in place of the transfer platform 6 and is designed specifically for handling heavy boxes or palletized loads. Plaform assembly 6a is comprised of pairs of axially aligned idler rollers 150, 151 and power rollers 152, 153 mounted between suitable frame members 154 and 155 which, in turn, are supported by pairs of tandem wheels 156 and smaller wheels 157. An angled plate 158 is mounted on the forward end of the assembly 6a to facilitate the positioning of the platform assembly underneath a pallet or other heavy object to be handled. Powered rollers 152, 153 are driven by a gear box 159 in the same manner as the power rollers of power roller assembly 4 previously described. In this modification the control switches may be mounted in a separate control box (not shown) connected to the platform assembly 6a by a control cable 160. The operation of platform 6a will be described in detail hereinafter.

As shown in FIG. 2, power transfer between gear box 9 of power base 1 and gear box 88 of power roller assembly 4 is accomplished by means of a splined shaft 106 extending between universal joint 14 at gear box 9 and universal joint 90 at gear box 88. Additional drive shafts 106 are provided to transmit power between successive power roller assemblies 4 which terminate at gear box 107 mounted on the front power roller assembly 4a. The shafts 106 together with the universal joints cooperate to provide a flexible drive shaft for the power rollers of the conveyor. Gear box 107 is identical to gear boxes 88 except that input shaft 108 is secured in position by a set collar 109 affixed to the front end thereof, as shown in FIG. 2. It will be appreciated that rotation of gear box shafts 91 by power transmitted from motor 8 by drive shafts 106 will cause power rollers 85, 86 to be rotated. For reasons to be explained hereinafter, gear boxes 9 and 88 are constructed so that for each given ratational direction of motor 8 output shafts 15 and 87 of gear boxes 9 and 88 will rotate in opposite directions.

Each center hinge means described above between adjacent power and idler assemblies is further provided with compression springs 110 held in position on each side of the hinged connection by cup-shaped spring retainers 111 which are secured to the respective assemblies as shown. Compression springs 110 are designed to cooperate with the center hinges to provide a predetermined self-aligning force to maintain conveyor longitudinal stability in the horizontal plane.

At this point it should be pointed out that pairs of power roller assemblies 4 and idler roller assemblies 5 may be used in multiples, the number of which depends on the desired length of the conveyor and the capacity of the power means.

*Conveyor storage and carrier rack*

Figure 12:
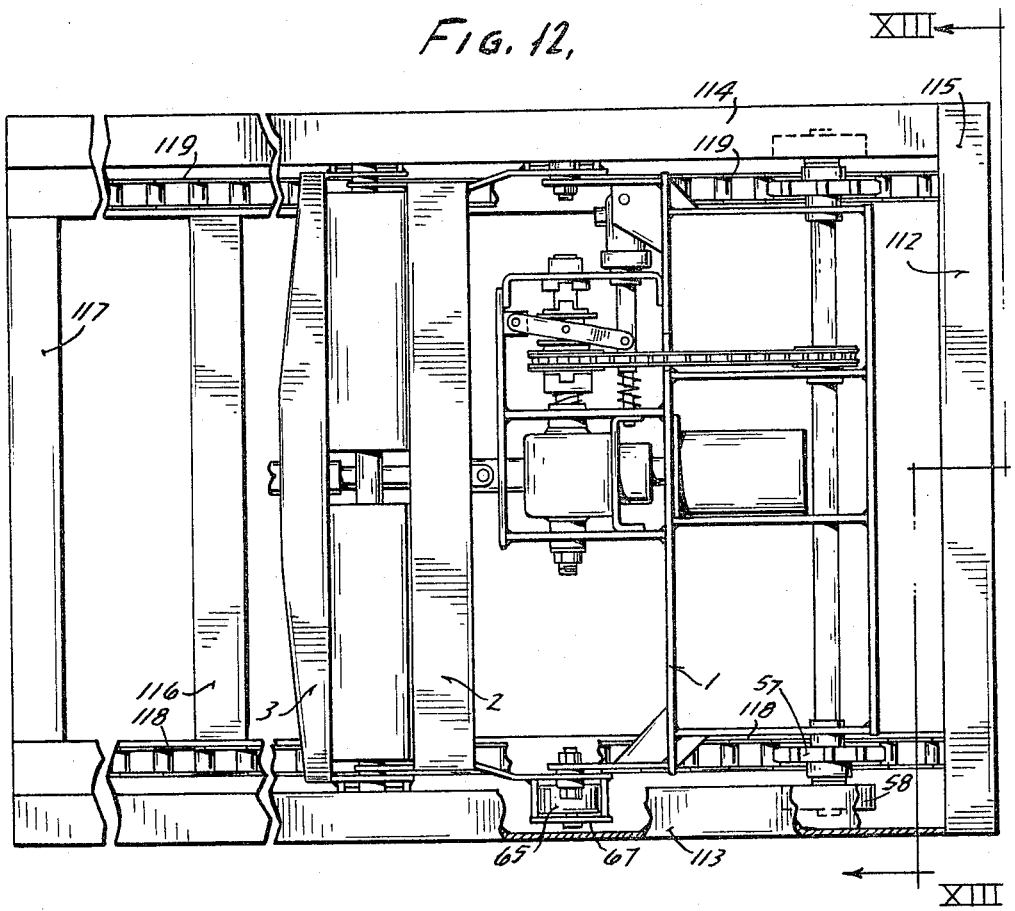
FIG. 12 is a fragmentary top plan view with parts broken away showing the conveyor of FIG. 1 mounted in its specially designed storage and carrier rack.
Figure 13:
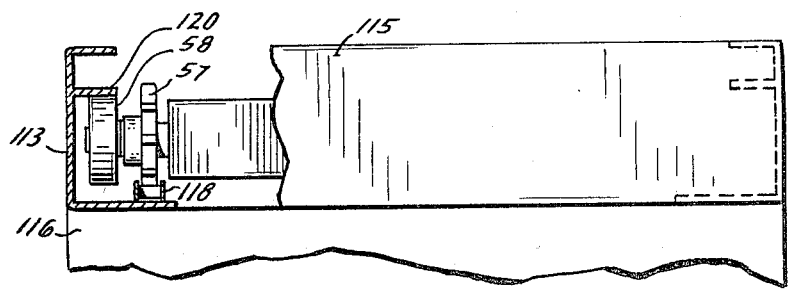
FIG. 13 is a sectional view taken along line 13—13 of FIG. 12.

As shown in FIGS. 12 and 13, the conveyor in the preferred embodiment is provided with a storage and carrier rack 112 comprising a pair of E-shaped longitudinal load members 113 and 114 secured together in proper spaced relation by cross members 115, 116 and 117. When not in use the conveyor is stored within the confines of the carrier as shown in FIGS. 12 and 13. To provide positive traction for the traction sprocket 57 when ejecting or retracting the conveyor from or into said carrier, load members 113 and 114 are each provided with a length of link chain 118 and 119 welded on the inside lower flange of said load members.

As clearly shown in FIG. 13, wheels 53 on power assembly 1 are adapted for engagement with the underside of the middle flange 120 of load members 113, 114 to hold power assembly 1 in proper position within carrier rack 112 during ejection and retraction of the conveyor.

In use, the above described carrier 112 may be a structural component of a hoist mechanism mounted on a self-propelled vehicle or truck chassis (not shown). The vehicle could also provide the electric and hydraulic power means to operate and control the conveyor in the various phases of its operation. Power and control circuitry could be supplied to the conveyor by a conventional self-reeling electric cable and hydraulic hose reel mounted on the hoist mechanism.

The foregoing describes in general a roller conveyor of very low profile provided with alternate powered and non-powered conveying roller components, each individually equipped with roller suspensions means and linked together to form a continuous self-supporting powered conveying surface of predetermined width and length. A conveyor constructed as described above can be employed to convey its load following its longitudinal center line which can be curved as desired to provide as much as 360 degrees of turn in the horizontal plane. The ability of the conveyor mechanism to conform to changes in direction in the horizontal plane is illustrated in FIG. 10 wherein a few of the many operational positions which may be employed are shown.

It is also noted that the above described conveyor construction permits of some degree of vertical articulation as shown in FIG. 11. The specific amount of articulation in the vertical plane which can be built into the device will vary depending on the particular requirement; however, it is contemplated that vertical angles reaching a maximum range of 15–18° will normally be provided in a typical conveyor designed for use in handling aircraft cargo.

*Operation*

*Ejection sequence.*—After raising the hoist mechanism or other means of conveyance (not shown) to bring the above described conveyor carrier 112 in proper alignment with an aircraft cargo hold door, the conveyor is power ejected as follows:

As shown in FIG. 9, the control system for the conveyor is comprised of a group of switches and solenoids identified by reference numeral 140 and two other groups of components identified by reference numerals 142 and 144. Preferably, control switches 140 are mounted on handle 104 of platform assembly 6 and component groups 142 and 144 are mounted on the hoist truck (or equivalent conveyance) and conveyor, respectively.

Referring now to FIG. 9, the conveyor is ejected by first closing master switch 121 to activate the electric control circuit shown in the drawing. Eject switch 122 is then closed which energizes solenoids 123, 124 and 125 which, in turn, will actuate hydraulic control valves 126, 127 and 128, respectively. The actuation of valves 126, 127 and 128 directs the hydraulic pressure from hydraulic pump 129 through hydraulic speed control valve 126 to a preset flow regulator valve 130. Reduced volumetric flow of hydraulic pressure from valve 130 is then directed by direction control valve 127 to eject rotation inlet 8b of the power base hydraulic motor 8. Since solenoid 125 is energized, a shuttle valve 131 also diverts a portion of the hydraulic pressure through a clutch cylinder valve 128 to actuate the power base hydraulic clutch cylinder 40.

The energization of cylinder 40 will force piston rod 43 outwardly against compression spring 45 to move the clutch throw-out lever 34 from the position shown in FIG. 5 to that shown in FIG. 3. The outward movement of piston rod 43 slides drive sprocket 27 to the left as viewed in FIG. 3 causing clutch jaw 24 to be engaged by clutch dog 28 to thus place axle 50 in driven engagement with output shaft 15 of gear box 9.

The eject rotation of output shaft 15 will cause drive sprocket 27 connected to axle sprocket 49 by chain 48 to drive the power base traction sprockets 57 in the forward or eject direction. As explained previously, traction sprockets 57 are restrained from disengagement with their respective link chains 118, 119 by press wheels 58 bearing against the integral longitudinal center rib 120 of the carrier load arm as shown in FIG. 15 thus making it possible to eject the conveyor from its carrier with no tractive loss.

As previously indicated, the conveyor can be ejected into positions wherein it will be curved in a horizontal plane as shown in FIG. 10. The transfer platform assembly 6 of the conveyor can be guided to place the conveyor in the desired position by means of handle 104. Also as previously indicated, the control switches 140 shown in the right-hand portion of FIG. 9 are preferably mounted on handle 104 so that the conveyor can be operated from the platform assembly end of the conveyor.

It should be noted at this point that in the preferred embodiment components are selected so that the speed of rotation imparted to the power conveyor rollers 85, 86 by gear box 88 is identical but opposite in direction to that of the traction sprockets 57, 57 of the power base assembly. This means that any load present on the conveyor during the ejection or retraction sequence will remain stationary with reference to a fixed object.

*Retraction sequence.*—To retract the conveyor, switch 132 is closed causing the same electrical circuits as described in the ejection sequence to become operative except that a solenoid 133 is energized instead of its opposite, solenoid 124, thus directing the hydraulic pressure to the retract rotation inlet 8a of the power base hydraulic motor 8. Such retract rotation of motor 8 will drive the power base traction sprockets 57, 57 in the rearward direction to thus retract the conveyor into its carrier.

*Forward conveying sequence.*—When forward switch 134 is closed, solenoid 133 is energized and solenoids 123 and 125 are deenergized. This actuates the direction control valve 127 into retract flow position and with solenoid 123 deenergized the full flow of hydraulic pump 129 will be applied to the retract rotation inlet 8a of the power base hydraulic motor 8. Hydraulic motor 8 thus drives the powered conveyor rollers 85, 86 of the power roller assemblies 4 and 4a in a forward rotation direction at a preset high rate of speed.

It will be appreciated that objects such as suitcases, boxes, and the like will be transferred along the conveyor by the rotating rollers 85, 86 of the powered roller assemblies 4 and 4a. As previously explained, the conveyor is made of alternately connected power roller and idler roller assemblies 4 and 5 which arrangement reduces the tendency of objects to be carried off the edges of the conveyor in areas where the conveyor is curved in the horizontal plane. Furthermore, by employing a pair of axially aligned and freely and independently rotatable idler rollers 96, 97 at each idler roller assembly 5 the tendency of object to fall off the conveyor at corners is further reduced because such rollers 96, 97 can rotate at different speeds in response to movement of objects thereover.

*Reverse conveying sequence.*—When reverse switch 136 is closed, solenoid 124 is energized and solenoids 123 and 125 are deenergized. This actuates the direction control valve into reverse flow position and directs the full flow from hydraulic pump 129 to the eject rotation inlet 8b of the power base hydraulic motor 8. This reverses the direction of power rollers 85, 86 from that described above.

In both of the above conveying sequences, solenoid 125 remains deenergized allowing compression spring 45 to retract the piston rod 43 of the power base hydraulic cylinder 40 to thereby move the parts from the position shown in FIG. 3 to the position shown in FIG. 5. In the FIG. 5 position clutch dog 28 will be disengaged from clutch jaw 24 and brake dog 30 will be engaged with stationary brake jaw 31 to thus prevent any movement of sprocket wheels 57. Thus, the conveyor as a whole will be locked in position with respect to carrier 112 during the forward and reverse conveying sequences described above.

The operation of the modified transfer platform assembly 6a is as follows. To pick up a palletized or other heavy load one end of the pallet is pried off the floor and the conveyor is ejected from carrier 112 to force angled front plate 158 thereunder to a point where power rollers 152, 153 can make contact with the pallet. The load is then released and the conveyor is again run in the eject direction to drive the platform plate 158 further under the load which action is aided by powered rollers 152, 153 which are being driven slowly in the opposite direction to thus exert a pulling force on the load. When the pallet is fully supported on the conveyor reverse switch 136 is closed to transfer the load back along the conveyor toward the power assembly 1 where it is unloaded at the desired location.

Although two embodiments of the present invention have been illustrated and described, it will be apparent to those skilled in the art that various changes and modifications may be made therein without departing from the spirit of the invention or from the scope of the appended claims.

We claim:
1. A power conveyor comprising:
 a power base assembly including a drive means mounted thereon;
 a plurality of power roller assemblies each including a power roller adapted for engagement with an object to be transferred thereover;
 a plurality of idler roller assemblies each of which includes a freely rotatably mounted idler roller means adapted to support objects to be transferred thereover;
 drive shaft means to establish driving engagement between said drive means on said power base assembly and said power roller on each of said power roller assemblies; and
 connection means for pivotally connecting said power base, said power roller and said idler roller assemblies together with said power roller assembly and said idler roller assembly alternately positioned with respect to each other.

2. A power conveyor according to claim 1 in which said idler roller means is comprised of a pair of independently rotatable axially aligned roller members.

3. A power conveyor according to claim 1 in which said power base, said power roller and said idler roller assemblies are provided with wheeled support means to facilitate movement of the conveyor over the ground, said power roller assembly further including a drive connection means adapted to establish driving engagement between said drive means and said wheeled support means on said power base assembly.

4. A power conveyor according to claim 1 in which said connection means includes a pair of compression spring members positioned between adjacent power roller and idler roller assemblies on opposite sides of the pivot point at which said assemblies are connected to each other.

5. A power conveyor according to claim 1 in which said drive shaft means includes a flexible drive shaft extending substantially the length of the conveyor and positioned beneath the level of said power rollers and said idler roller means.

6. A power conveyor comprising:
 a power base assembly having a wheeled support means and further including a drive means mounted thereon adapted for driving engagement with said wheeled support means;
 a plurality of power roller assemblies each having a wheeled support means and a rotatably mounted power roller adapted for engagement with an object to be transferred thereover;
 a plurality of idler roller assemblies each having a wheeled support means and a freely rotatably mounted idler roller means adapted to support objects to be transferred thereover;
 drive shaft means to establish driving engagement between said drive means on said power base assembly and the power roller on each of said power roller assemblies;
 connection means for pivotally connecting said power base, said power roller and said idler roller assemblies together; and
 control means for selectively coupling said drive means with said wheel support means on said power base assembly.

7. A power conveyor according to claim 6 in which said control means is further adapted to establish driving connection between said drive means and both said power base wheeled support means and said power rollers so that when said wheeled support means is driven in one direction said power rollers will be driven in the opposite direction.

8. A power conveyor comprising:
 a power base assembly having a wheeled support means and further including a drive means mounted thereon adapted for driving engagement with said wheeled support means;
 a plurality of power roller assemblies each having a wheeled support means and a rotatably mounted power roller adapted for engagement with an object to be transferred thereover;

a plurality of idler roller assemblies each having a wheeled support means and a freely rotatably mounted idler roller means adapted to support objects to be transferred thereover;

drive shaft means to establish driving engagement between said drive means on said power base assembly and the power roller on each of said power roller assemblies;

connection means for pivotally connecting said power base, said power roller and said idler roller assemblies together; and a carrier frame means adapted to receive and support said power base, power roller and idler roller assemblies within its confines with said wheeled support means on said power base assembly positioned for engagement with said carrier frame means so that when said wheeled support means is driven by said drive means the entire conveyor will be ejected or retracted with respect to said carrier frame means.

9. A power conveyor according to claim 8 in which said power roller assemblies and said idler roller assemblies are alternately positioned with respect to each other.

10. A power conveyor according to claim 8 in which said connection means includes a pair of compression spring members positioned between adjacent power roller and idler roller assemblies on opposite sides of the pivot point at which said assemblies are connected to each other.

11. A power conveyor according to claim 8 in which said drive shaft means includes a flexible drive shaft extending substantially the length of the conveyor and positioned beneath the level of said power rollers and said idler roller means.

12. A power conveyor comprising:

a power base assembly having a wheeled support means and further including a drive means mounted thereon adapted for driving engagement with said wheeled support means;

a plurality of power roller assemblies each having a wheeled support means and a rotatably mounted power roller adapted for engagement with an object to be transferred thereover;

a plurality of idler roller assemblies each having a wheeled support means and a freely rotatably mounted idler roller means adapted to support objects to be transferred thereover;

drive shaft means to establish driving engagement between said drive means on said power base assembly and the power roller on each of said power roller assemblies;

a platform assembly having a wheeled support means; and connection means for pivotally connecting said power base, said power roller, said idler roller, and said platform assemblies together in a row with said power base assembly positioned at one end and said platform assembly positioned at the other end and with said power roller and idler roller assemblies alternately positioned with respect to each other.

13. A power conveyor according to claim 12 in which said platform assembly includes a downwardly angled plate member on the forward end thereof adapted to facilitate movement of said platform assembly beneath an object to be loaded thereon and further including a power roller rotatably mounted on said platform assembly and in driven engagement by said drive shaft means.

14. A power conveyor according to claim 12 in which each of said power roller assemblies includes a gear box mounted thereon operatively connected between said drive shaft means and said rotatably mounted power roller.

References Cited by the Examiner

UNITED STATES PATENTS

| | | |
|---|---|---|
| 151,253 | 5/1874 | Osborne et al. |
| 778,613 | 12/1907 | Ward _____ 214—84 |
| 2,494,302 | 1/1950 | Mason. |

GERALD M. FORLENZA, *Primary Examiner.*

A. J. MAKAY, *Assistant Examiner.*